(12) United States Patent
Fujita et al.

(10) Patent No.: US 9,272,338 B2
(45) Date of Patent: Mar. 1, 2016

(54) MACHINE TOOL

(75) Inventors: Yoshihito Fujita, Tokyo (JP); Hiroyuki Sakoshi, Tokyo (JP); Hiroo Nabeta, Tokyo (JP); Mikio Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 183 days.

(21) Appl. No.: 13/990,573

(22) PCT Filed: Nov. 25, 2011

(86) PCT No.: PCT/JP2011/077125
§ 371 (c)(1),
(2), (4) Date: Sep. 3, 2013

(87) PCT Pub. No.: WO2012/117628
PCT Pub. Date: Sep. 7, 2012

(65) Prior Publication Data
US 2013/0336737 A1    Dec. 19, 2013

(30) Foreign Application Priority Data

Mar. 3, 2011 (JP) ................................. 2011-045919

(51) Int. Cl.
*B23P 23/00* (2006.01)
*B23C 1/00* (2006.01)
(Continued)

(52) U.S. Cl.
CPC ............... *B23B 41/00* (2013.01); *B21J 15/142* (2013.01); *B23B 39/006* (2013.01);
(Continued)

(58) Field of Classification Search
CPC ........... Y10T 409/307728; Y10T 409/308288; B23C 1/002; B23Q 1/012; B23Q 39/026; B23Q 1/60; B23B 39/006

USPC .................................................. 409/202, 212
See application file for complete search history.

(56) References Cited

U.S. PATENT DOCUMENTS 2,245,558 A * 6/1941 Johnson ......................... 409/212
2,671,233 A * 3/1954 Marchant et al. .................. 408/3
(Continued)

FOREIGN PATENT DOCUMENTS

GB           725 662 A      3/1955
JP           58-89496 A     5/1983
(Continued)

OTHER PUBLICATIONS

Extended European Search Report dated Jul. 11, 2014 for European Application No. 11 85 9789.
(Continued)

*Primary Examiner* — Erica E Cadugan
(74) *Attorney, Agent, or Firm* — Birch, Stewart, Kolasch & Birch, LLP

(57) ABSTRACT

Provided is a machine tool, which is capable of highly accurately performing machining with respect to a bent surface of a subject to be machined. The machine tool fixes work (W), which has an upper flat surface (Wa) and a lower bent surface (Wb), in a state wherein the upper flat surface (Wa) is horizontally disposed, and makes a hole in the lower bent surface (Wb). The machine tool is provided with: a lower machining head (25), which has rotatably mounted thereon a tool (T1) that makes the hole in the lower bent surface (Wb); a lower saddle (24) which moves the lower machining head (25) in the axis direction of the tool (T1); and a lower cross rail (23), which is provided by being tilted, with respect to the upper flat surface (Wa), at a tilt angle ($\alpha$) that is set corresponding to the curvature of the lower bent surface (Wb), and which supports the lower saddle (24) such that the lower saddle can move in the tilt direction of the tilt angle ($\alpha$).

2 Claims, 2 Drawing Sheets

(51) Int. Cl.
| | |
|---|---|
| *B23C 3/16* | (2006.01) |
| *B23Q 1/01* | (2006.01) |
| *B23Q 1/60* | (2006.01) |
| *B23Q 39/02* | (2006.01) |
| *B23B 41/00* | (2006.01) |
| *B21J 15/14* | (2006.01) |
| *B23C 3/18* | (2006.01) |
| *B23B 39/16* | (2006.01) |
| *B23C 3/00* | (2006.01) |
| *B23B 39/00* | (2006.01) |
| *B23Q 3/06* | (2006.01) |
| *B23Q 39/00* | (2006.01) |
| *B23C 1/08* | (2006.01) |
| *B64F 5/00* | (2006.01) |

(52) U.S. Cl.
CPC ............. *B23B 39/168* (2013.01); *B23C 1/002* (2013.01); *B23C 3/00* (2013.01); *B23C 3/18* (2013.01); *B23Q 1/012* (2013.01); *B23Q 1/015* (2013.01); *B23Q 1/60* (2013.01); *B23Q 3/062* (2013.01); *B23Q 39/026* (2013.01); *B23B 2215/04* (2013.01); *B23C 1/08* (2013.01); *B23C 2215/04* (2013.01); *B23Q 2039/002* (2013.01); *B64F 5/0009* (2013.01); *Y10T 29/5107* (2015.01); *Y10T 29/5118* (2015.01); *Y10T 408/38* (2015.01); *Y10T 408/561* (2015.01); *Y10T 409/30756* (2015.01); *Y10T 409/307168* (2015.01); *Y10T 409/308288* (2015.01); *Y10T 409/309016* (2015.01); *Y10T 409/309576* (2015.01)

(56) References Cited

U.S. PATENT DOCUMENTS

| | | | |
|---|---|---|---|
| 2,742,824 | A | 4/1956 | Watson |
| 4,061,077 | A | 12/1977 | Gladwin |
| 4,583,891 | A | 4/1986 | Eschenfelder et al. |
| 4,658,485 | A * | 4/1987 | Yang .............................. 29/26 A |
| 4,894,903 | A | 1/1990 | Woods |
| 4,962,583 | A * | 10/1990 | Yang ................................ 483/32 |
| 5,033,178 | A | 7/1991 | Woods |
| 5,154,643 | A | 10/1992 | Catania et al. |
| 5,839,323 | A * | 11/1998 | Line .............................. 409/212 |
| 6,223,413 | B1 * | 5/2001 | Crocker et al. ............... 409/202 |
| 6,314,830 | B2 | 11/2001 | Munk et al. |
| 2011/0302784 | A1 | 12/2011 | Yamane et al. |

FOREIGN PATENT DOCUMENTS

| | | | |
|---|---|---|---|
| JP | 04-250911 A * | 9/1992 | |
| JP | 2002-178041 A | 6/2002 | |
| JP | 2010-201986 A | 6/2002 | |
| JP | 2005-125414 A | 5/2005 | |
| JP | 4128626 B2 | 7/2008 | |
| WO | WO 99/37429 A1 | 7/1999 | |
| WO | WO 2010/098242 A1 | 9/2010 | |

OTHER PUBLICATIONS

International Preliminary Report on Patentability, and Translation of Written Opinion of the International Searching Authority, dated Sep. 12, 2013, for International Application No. PCT/JP2011/077125 (Forms PCT/IB/338, PCT/IB/373 and PCT/ISA/237).

International Search Report dated Feb. 28, 2012 for International Application No. PCT/JP2011/077125 (PCT/ISA/220 and PCT/ISA/210) with English translation.

* cited by examiner

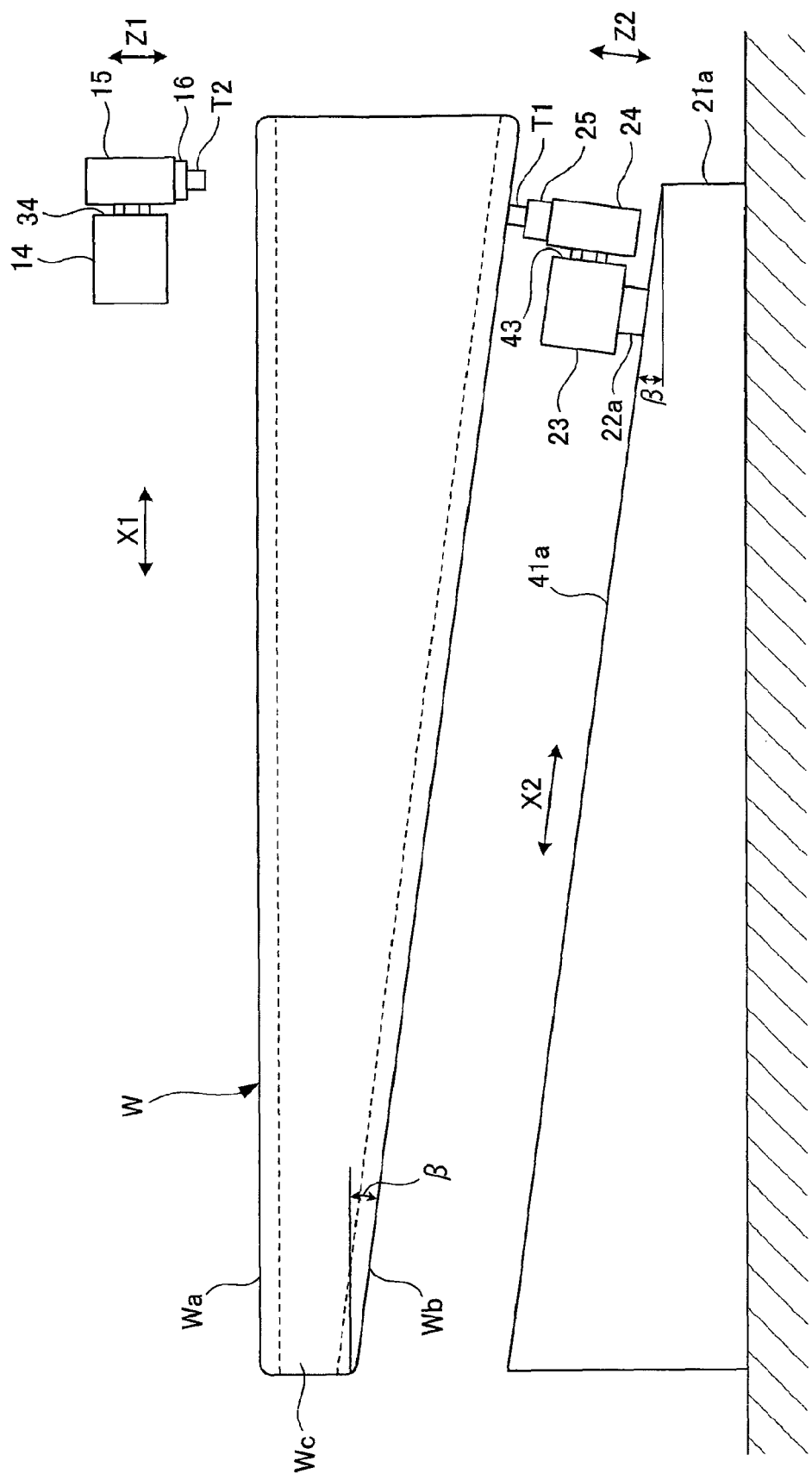

MACHINE TOOL

TECHNICAL FIELD

The present invention relates to a machine tool capable of performing machining on a curved surface of a workpiece.

BACKGROUND ART

Generally, in a case of manufacturing a wing of an aircraft, wing elements such as spars, skins, and ribs are independently manufactured and the wing is assembled by joining these wing elements together with rivets, fasteners and the like. In the above-mentioned manufacturing of the wing elements and the above-mentioned joining of the wing elements, various types of machining is performed by using various types of machine tools to satisfy assembly precision of a completed wing.

For example, in Patent Document 1, a wing is assembled by joining two divided wing structures at the final stage. In the joining of the divided wing structures, flattening is performed on joining surfaces of the divided wing structures to improve surface accuracy in the joining surfaces.

PRIOR ART DOCUMENT

Patent Document

Patent Document 1: Japanese Patent Application Publication No. 58-89496

SUMMARY OF THE INVENTION

Problems to be Solved by the Invention

Here, since the wing as a completed product has a streamline shape, some of the wing elements forming the wing have curved surface shapes. However, the conventional machine tool described above is a machine dedicated to the flattening. Accordingly, although the conventional machine tool can be used for machining on a flat surface to be machined, it is difficult to use the conventional machine tool for machining to be machined on a curved surface.

The present invention solves the problems described above and an object thereof is to provide a machine tool capable of performing highly accurate machining on a curved surface to be machined.

Means for Solving the Problems

A machine tool of a first aspect of the invention which solves the problems described above is a machine tool machine tool configured to hold a workpiece having a flat surface and a curved surface opposed to the flat surface with the flat surface disposed horizontally and to perform machining on the curved surface, characterized in that the machine tool comprises: a first machining head to which a first rotary tool configured to perform machining on the curved surface is rotatably attached; a first saddle which moves the first machining head in an axis direction (Z2 axis direction) of the first rotary tool; and a first cross rail which is provided to be inclined with respect to the flat surface at a predetermined first inclination angle ($\alpha$) set in accordance with a curvature of the curved surface and which supports the first saddle in such a way that the first saddle is movable in an inclination direction (Y2 axis direction) of the first inclination angle.

A machine tool of a second aspect of the present invention which solves the problems descried above is characterized in that the curved surface is formed to be inclined with respect to the flat surface at a predetermined second inclination angle ($\beta$) in a direction (X1 axis direction) orthogonal to the inclination direction of the first inclination angle, and the machine tool comprises a first bed which supports the first cross rail in such a way that the first cross rail is movable in an inclination direction (X2 axis direction) of the second inclination angle.

A machine tool of a third aspect of the present invention which solves the problems descried above is characterized in that the machine tool comprises: a second machining head to which a second rotary tool configured to perform machining on the flat surface is rotatably attached; a second saddle which moves the second machining head in an axis direction (Z1 axis direction) of the second rotary tool; and moving means for moving the second saddle in a horizontal direction (X1 axis direction, Y1 axis direction), and the machining on the curved surface by the first rotary tool and the machining on the flat surface by the second rotary tool are performed simultaneously.

Effect of the Invention

In the machine tool of the present invention, the first machining head can be moved along the shape of the curved surface. Accordingly, the first rotary tool can be moved in the direction orthogonal to a predetermined machining position on the curved surface. In addition, since a stroke amount of the first machining head can be reduced, the stiffness of the first machining head can be improved. Accordingly, highly-accurate machining can be performed on the curved surface of the object to be machined.

BRIEF DESCRIPTION OF THE DRAWINGS

FIG. 2 is a cross-sectional view taken along the line A-A of FIG. 1 and viewed in the direction of the arrows.

MODE FOR CARRYING OUT THE INVENTION

Figure 1:
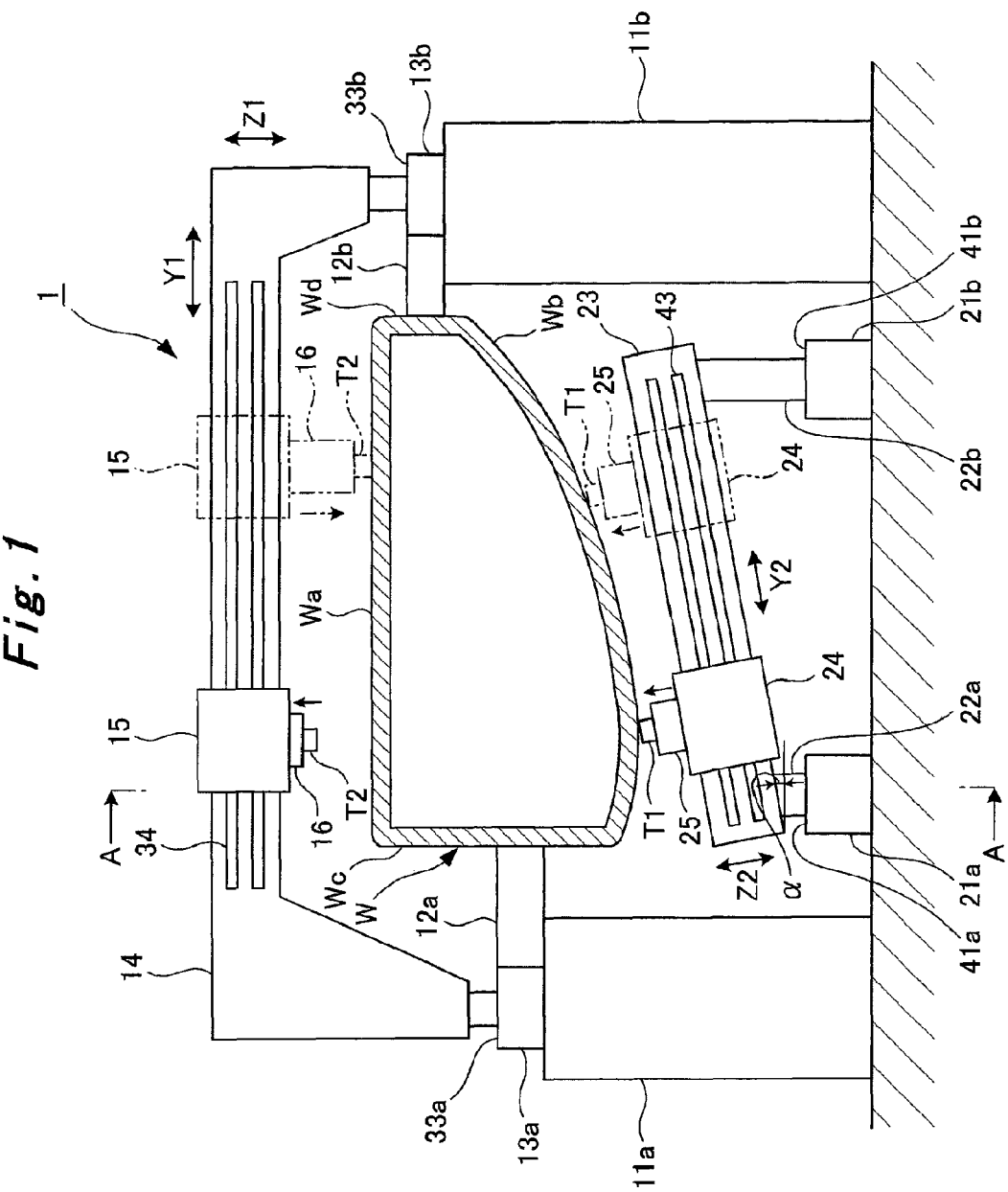
FIG. 1 is a front view of a machine tool in one embodiment of the present invention.

A machine tool of the present invention is described below in detail by using the drawings.

Embodiment

First, a machine tool 1 shown in FIGS. 1 and 2 is a machine tool which performs hole drilling on an upper flat surface Wa and a lower curved surface Wb of a tubular workpiece W. The workpiece is to be, for example, a skeletal structure of a wing in an aircraft.

Here, the upper flat surface Wa of the workpiece W is formed to be flat and is opposed to the lower curved surface Wb. Meanwhile, the lower curved surface Wb of the workpiece W is curved to have a predetermined curvature in a workpiece width direction and is inclined in a workpiece longitudinal direction with respect to the upper flat surface Wa at a predetermined inclination angle (second inclination angle) $\beta$. In other words, the lower curved surface Wb has an inclined curved surface shape.

Moreover, the machine tool 1 holds the workpiece W with the upper flat surface Wa facing upward and being disposed horizontally, and performs the hole drilling on the upper flat surface Wa and the lower curved surface Wb. Specifically, in the machine tool 1, the workpiece W is held with the lower curved surface Wb inclined with respect to the horizontally-disposed upper flat surface Wa. Such a held state of the workpiece W during the hole drilling is the same as an installation (fixed) state of the workpiece W incorporated in the wing of the aircraft when the wing is installed on the aircraft.

Next, the configuration of the machine tool 1 is described in detail by using FIGS. 1 and 2.

As shown in FIGS. 1 and 2, a pair of left and right side walls 11a, 11b are provided respectively on left and right sides of the machine tool 1 to extend in a horizontal X1 axis direction (machine vertical direction). Fixtures 12a, 12b are provided respectively on upper surfaces of the side walls 11a, 11b. A left side surface Wc and a right side surface Wd of the workpiece W are fixed respectively to the fixtures 12a, 12b.

Moreover, upper beds (second beds) 13a, 13b are provided on outer sides of the fixtures 12a, 12 on the upper surfaces of the side walls 11a, 11b to extend in the X1 axis direction. Furthermore, an upper cross rail (second cross rail) 14 having a gate shape is supported on upper guide surfaces 33a, 33b of the upper beds 13a, 13b to be movable in the X1 axis direction while bridging over the workpiece W.

An upper saddle (second saddle) 15 is supported on a front guide surface 34 of the upper cross rail 14 to be movable in a horizontal Y1 axis direction (machine width direction). Moreover, an upper machining head (second machining head) 16 is supported in the upper saddle 15 to be slidable in a vertical Z1 axis direction (machine up-down direction). A tool (second rotary tool) T2 such a drill is rotatably attached to a lower end of the upper machining head 16.

Accordingly, moving the upper cross rail 14 in the X1 axis direction and moving the upper saddle 15 in the Y1 axis direction can cause the upper machining head 16 to horizontally move along the upper flat surface Wa of the horizontally-disposed workpiece W. Furthermore, moving the upper machining head 16, which is positioned in the X1 axis direction and the Y1 axis direction, in the Z1 axis direction (axis direction of the tool T2) by using the upper cross rail 14 and the upper saddle 15 can cause the tool T2 to move in a direction orthogonal to the upper flat surface Wa of the horizontally-disposed workpiece W.

Moreover, a pair of left and right lower beds (first beds) 21a, 21b are provided on inner sides of the side walls 11a, 11b to extend in the X1 axis direction. Here, upper guide surfaces 41a, 41b of the lower beds 21a, 21b are inclined upward while extending from a front end toward a rear end and are set to have the same inclination angle as the inclination angle β of the lower curved surface Wb in the workpiece W in the held state.

Lower moving members 22a, 22b are supported on the upper guide surfaces 41a, 41b of the lower beds 21a, 21b to be movable in an X2 axis direction (inclination direction of the upper guide surfaces 41a, 41b). The lower moving members 22a, 22b are different in height and the height of the lower moving member 22a is set to be lower than the height of the lower moving member 22b in accordance with a curvature (curved surface shape) of the lower curved surface Wb of the workpiece W. Moreover, a lower cross rail (first cross rail) 23 is laid between upper ends of the lower moving members 22a, 22b. Specifically, the lower cross rail 23 is movable in the X2 axis direction while having a predetermined inclination angle (first inclination angle) α set in accordance with the curvature of the lower curved surface Wb of the workpiece W.

A lower saddle (first saddle) 24 is supported on a front guide surface 43 of the lower cross rail 23 to be movable in a Y2 axis direction (inclination direction of the front guide surface 43) orthogonal to the X1 axis direction and the X2 axis direction. Moreover, a lower machining head (first machining head) 25 is supported on the lower saddle 24 to be slidable in a Z2 axis direction orthogonal to the Y2 axis direction, and a tool (first rotary tool) T1 such a drill is rotatably attached to an upper end of the lower machining head 25.

Accordingly, moving the lower cross rail 23 in the X2 axis direction and moving the lower saddle 24 in the Y2 axis direction can cause the lower machining head 25 to move along the lower curved surface Wb of the workpiece W which is curved and inclined. Furthermore, moving the lower machining head 25, which is positioned in the X2 axis direction and the Y2 axis direction, in the Z2 axis direction (axis direction of the tool T1) by using the lower cross rail 23 and the lower saddle 24 can cause the tool T1 to move in a direction orthogonal to the lower curved surface Wb of the workpiece W which is curved and inclined.

In this respect, when the hole drilling is to be performed on the upper flat surface Wa and the lower curved surface Wb of the workpiece W by using the machine tool 1, first, the left side surface Wc and the right side surface Wd of the workpiece W are fixed to the fixtures 12a, 12b. In this case, the workpiece W is fixed with the upper flat surface Wa disposed horizontally.

Next, the upper machining head 16 is disposed at a predetermined position by moving the upper cross rail 14 in the X1 axis direction and by moving the upper saddle 15 in the Y1 axis direction. Then, the upper machining head 16 is moved in the Z1 axis direction by a predetermined stroke amount and a hole is drilled by the rotating tool T2 at a predetermined hole drilling position on the upper flat surface Wa of the workpiece W.

At the same time, the lower machining head 25 is disposed at a predetermined position by moving the lower cross rail 23 in the X2 axis direction and by moving the lower saddle 24 in the Y2 axis direction. Then, the lower machining head 25 is moved in the Z2 axis direction by a predetermined stroke amount and a hole is drilled by the rotating tool T1 at a predetermined hole drilling position on the lower curved surface Wb of the workpiece W.

The hole drilling by the tool T1 and the hole drilling by the tool T2 described above are further performed simultaneously and a predetermined number of holes are drilled for each of the upper flat surface Wa and the lower curved surface Wb of the workpiece W.

Next, the workpiece W for which the hole drilling is completed is removed from the machine tool 1. Thereafter, skins (not illustrated) of the wing are attached to the upper flat surface Wa and the lower curved surface Wb of the workpiece W by using the machined multiple holes.

All of the holes machined by the tools T1, T2 are thereby opened orthogonal to the upper flat surface Wa and the lower curved surface Wb at the predetermined hole drilling positions on the upper flat surface Wa and the lower curved surface Wb in the workpiece W. Accordingly, the skins can be highly accurately attached.

The machine tool 1 described above is configured to hold the workpiece W with the upper flat surface Wa facing upward and being disposed horizontally and to perform the hole drilling on the upper flat surface Wa and the lower curved surface Wb. However, the machine tool 1 may be configured to hold the workpiece W with the upper flat surface Wa facing downward and being disposed horizontally and to perform the hole drilling on the upper flat surface Wa and the lower curved surface Wb.

The configuration described above may be a configuration as follows. For example, the upper beds 13a, 13b, the upper cross rail 14, the upper saddle 15, the upper machining head 16, and the like which are used to move the tool T2 are disposed on a lower side of the machine tool 1 in a reversed manner with respect to the held workpiece W while the lower beds 21a, 21b, the lower cross rail 23, the lower saddle 24, the lower machining head 25, and the like which are used to move the tool T1 are disposed on an upper side of the machine tool 1 in a reversed manner with respect to the held workpiece W.

Moreover, in the machine tool 1 described above, the hole drilling is performed by attaching the tools T1, T2 for drilling. However, flattening can be performed by attaching a tool for milling. Furthermore, tools capable of performing types of machining different from each other, regardless of the drilling and the milling, may be attached respectively to the upper machining head 16 and the lower machining head 25.

In the machine tool 1 of the present invention, the workpiece W having the flat upper flat surface Wa and the curved lower curved surface Wb is held with the upper flat surface Wa disposed horizontally, the lower cross rail 23 is provided to be inclined with respect to the upper flat surface Wa at the inclination angle α set in accordance with the curvature of the lower curved surface Wb, and the lower machining head 25 to which the tool T1 is attachable is movably supported on the lower cross rail 23. Accordingly, the lower machining head 25 can be move along the curved surface shape of the lower curved surface Wb. This can cause the tool T1 to move in the direction orthogonal to a predetermined hole drilling position on the lower curved surface Wb. Moreover, since the stroke amount of the lower machining head 25 can be reduced, the stiffness of the lower machining head 25 can be improved. As a result, a highly-accurate hole drilling can be performed on the lower curved surface Wb of the workpiece W.

Moreover, the lower beds 21a, 21b inclined at the same inclination angle as the inclination angle β of the lower curved surface Wb in the workpiece W are provided and the lower cross rail 23 is movably supported on the upper guide surfaces 41a, 41b of the lower beds 21a, 21b. Accordingly, the lower machining head 25 can be move along the inclination of the lower curved surface Wb. This enables the hole drilling to be highly accurately performed on the lower curved surface Wb even if the lower curved surface Wb is inclined.

Furthermore, the upper machining head 16 to which the tool T2 is attachable is provided to be movable in the horizontal direction, the tool T2 configured to perform the hole drilling on the upper flat surface Wa of the workpiece W, and the hole drilling on the lower curved surface Wb by the tool T1 and the hole drilling on the upper flat surface Wa by the tool T2 are performed simultaneously. This can improve the efficiency of the hole drilling.

Industrial Applicability

The present invention can be applied to a machine tool configured to perform machining on a three-dimensional curved surface.

The invention claimed is:

1. A machine tool configured to hold a workpiece having a flat surface and a curved surface opposed to the flat surface with the flat surface disposed horizontally, one end of the curved surface being closer to the flat surface than is another end of the curved surface in a vertical width plane that includes a workpiece width direction, and the machine tool configured to perform machining on the curved surface, characterized in that the machine tool comprises:
 a first machining head to which a first rotary tool configured to perform machining on the curved surface is rotatably attached;
 a first saddle which moves the first machining head in direction of a longitudinal axis of the first rotary tool; and
 a first cross rail which is provided such that a longitudinal axis of the first cross rail is inclined with respect to the flat surface and with respect to a vertical direction in the width plane at a first inclination angle, and which first cross rail supports the first saddle in such a way that the first saddle is movable in an inclination direction along the longitudinal axis of the first cross rail that is at the first inclination angle, and
 the curved surface is formed to be inclined with respect to the flat surface and with respect to a vertical direction at a predetermined second inclination angle in a vertical longitudinal plane that extends in a longitudinal direction of the workpiece, which longitudinal plane is orthogonal to the vertical width plane, and
 the machine tool is provided with:
 a pair of left and right first beds, left and right being with respect to the width plane, the pair of left and right first beds each having a respective guide surface, each of the guide surfaces being inclined in an inclination direction at the second inclination angle in the longitudinal plane; and
 a pair of left and right moving members, left and right being with respect to the width plane, each of the left and right moving members being supported on a respective one of the guide surfaces to be movable in the inclination direction of the guide surfaces, and which moving members support the first cross rail between upper ends of the moving members with the first cross rail inclined at the first inclination angle, such that the first cross rail moves linearly in the inclination direction of the guide surfaces, and wherein the upper ends are set at different heights.

2. The tool machine according to claim 1, characterized in that the machine tool comprises:
 a second machining head to which a second rotary tool configured to perform machining on the flat surface is rotatably attached; and
 a second saddle which moves the second machining head in direction of a longitudinal axis of the second rotary tool,
 the second saddle being movable in a horizontal direction, and
 the machining on the curved surface by the first rotary tool and the machining on the flat surface by the second rotary tool are performed simultaneously.

* * * * *